Patented Dec. 21, 1937

2,103,160

UNITED STATES PATENT OFFICE 2,103,160

STABLE AQUEOUS SOLUTIONS OF ANESTHETIC SUBSTANCES AND PROCESS OF PREPARING THEM

Adolf Kircher and Max Sienz, Frankfort-on-the-Main, Germany, assignors to Winthrop Chemical Company Inc., New York, N. Y., a corporation of New York No Drawing. Application November 1, 1934, Serial No. 751,099. In Germany November 11, 1933

12 Claims. (Cl. 167—52)

Our present invention relates to stable aqueous solutions of anesthetic substances and to a process of preparing them.

The application of neutral or weakly alkaline, but not markedly acid solutions of anesthetic substances is of great importance in medicine and dentistry in order to eliminate disagreeable by-effects, such as, for instance, irritating effects or the like.

The commercial solutions of the salts of the esters or of the alkamine esters of amino-benzoic acids and alkylaminobenzoic acids, for instance, of the hydrochloride of para-aminobenzoic acid-diethylaminoethylester must be sterilized in a current of steam after having been filled into ampoules. By this operation the ester may be partially saponified with formation of free para-aminobenzoic acid. The pH-value of the solution may thus be reduced from nearly 6 to about 4.8.

It has already been tried to neutralize the acid by addition of small amounts of alkalies. This entailed, however, a far-reaching saponification and was the cause of more acid being split off.

Now we have found that the pH-value of the solutions of anesthetic substances which are easily saponifiable with formation of free acids may during the sterilization and further storage be kept near the most favorable values of 6 to 7 by addition of even comparatively small amounts of neutral urea. The amount added is generally about 1 gram to about 2 grams of urea per 1000 cc. of the solution.

It may be presumed that when the solutions are heated in the current of steam the urea yields only the quantity of ammonium carbonate necessary for neutralizing the acid formed by the partial saponification of the ester.

As substances having an anesthetic effect there may be used, for instance, the water-soluble salts, such as hydrochlorides, sulfates, nitrates or tartrates of the compounds described in U. S. Patents Nos. 812,554, 1,550,350, 1,704,660 and 1,889,645. Para-aminobenzoic acid dimethylamino-methyl-butylester-hydrochloride, para-butylaminobenzoic acid dimethylaminoethylester-hydrochloride, para-aminobenzoic acid dibutylaminopropyl-ester-sulfate and para-aminobenzoic acid-2.2-dimethyl-diethylamino-1-propylester-hydrochloride are particularly mentioned. There may be added the water-soluble salts of agents that constrict the blood vessels, for instance, the hydrochlorides or bitartrates of 1-(3.4-dihydroxyphenyl)-2-methylaminoethanol ("levo-epinephrin"), 1-(3.4-dihydroxyphenyl)-2-aminopropanol or 1-(3.4-dihydroxyphenyl)-2-aminoethanol.

The following example illustrates the invention, but is not intended to limit it thereto.

A solution of 20 grams of the hydrochloride of para-aminobenzoyl-diethylaminoethanol, 0.2 gram of the hydrochloride of 1-(3.4-dihydroxyphenyl)-2-aminopropanol-(1), 2 grams of sodium chloride, 4 grams of potassium sulfate and 1 to 2 grams of urea in 1 liter of re-distilled water, prepared with the use of indifferent gases and filled into ampoules, shows at 22° C. a pH-value of 6.3 and, when heated for 20 minutes in a current of steam it shows a pH-value of 6.35.

In contradistinction thereto a solution of the same composition but not containing urea had after the sterilization a pH-value of about 4.8.

Stable solutions of other substances having an anesthetic action, such as of the hydrochloride of para-butylaminobenzoyl-dimethylamino-methyl-ethanol may be prepared in an analogous manner.

We claim:

1. Aqueous sterilized solutions having, after the sterilization, a pH-value of about 6 to about 7 comprising urea and a salt of an ester of an aminobenzoic acid having an anesthetic effect.

2. Aqueous sterilized solutions having, after the sterilization, a pH-value of about 6 to about 7 comprising about 0.1 to about 0.2 per cent of urea and a salt of an ester of an amino-benzoic acid having an anesthetic effect.

3. Aqueous sterilized solutions having, after the sterilization, a pH-value of about 6 to about 7 comprising about 0.1 to about 0.2 per cent of urea, an inorganic acid salt of an ester of a para-aminobenzoic acid having an anesthetic effect and a vaso-constrictor agent.

4. Aqueous sterilized solutions having, after the sterilization, a pH-value of about 6 to about 7 comprising about 0.1 to about 0.2 per cent of urea, the hydrochloride of para-amino-benzoyl-diethylaminoethanol and a vaso-constrictor agent.

5. Aqueous sterilized solutions having, after the sterilization, a pH-value of about 6 to about 7 comprising about 0.1 to about 0.2 per cent of urea and the hydrochloride of para-butyl-aminobenzoyl-dimethylaminoethanol.

6. Aqueous sterilized solutions having, after the sterilization, a pH-value of about 6 to about 7 comprising in 1000 cc. of water about 1 to about 2 grams of urea, 20 grams of the hydrochloride of para-aminobenzoyl-diethylaminoethanol, 0.2 gram of 1-(3.4-dihydroxyphenyl)-2-aminopropanol-1, 2 grams of sodium chloride and 4 grams of potassium sulfate.

7. In the process of sterilizing an aqueous solution of a salt of an ester of an amino benzoic acid having an anesthetic effect by heating said solution, the step of preventing the liberation of free acid which comprises adding urea to said solution before the heat treatment.

8. In the process of sterilizing an aqueous solution of a salt of an ester of aminobenzoic acid having an anesthetic effect by heating said solution, the step of preventing the liberation of free acid which comprises adding about 1 to about 2 grams of urea to 1000 cc. of said solution before the heat treatment.

9. In the process of sterilizing an aqueous solution of an inorganic acid salt of an ester of para-aminobenzoic acid having an anesthetic effect and a vaso-constricting agent by heating said solution, the step of preventing the liberation of free acid which comprises adding about 1 to about 2 grams of urea to 1000 cc. of said solution before the heat treatment.

10. In the process of sterilizing an aqueous solution of the hydrochloride of para-aminobenzoyl-diethylaminoethanol and a vasoconstricting agent by heating said solution, the step of preventing the liberation of free acid which comprises adding about 1 to about 2 grams of urea to 1000 cc. of said solution before the heat treatment.

11. In the process of sterilizing an aqueous solution of the hydrochloride of para-butylamino-benzoyl-dimethylaminoethanol by heating said solution, the step of preventing the liberation of free acid which comprises adding about 1 to about 2 grams of urea to 1000 cc. of said solution before the heat treatment.

12. In the process of sterilizing an aqueous solution of 20 grams of the hydrochloride of para-aminobenzoyl-diethylamino-ethanol, 0.2 gram of 1-(3.4-dihydroxyphenyl)-2-aminopropanol-1, 2 grams of sodium chloride and 4 grams of potassium sulfate by heating said solution, the step of preventing the liberation of free acid which comprises adding about 1 to about 2 grams of urea to 1000 cc. of said solution before the heat treatment.

ADOLF KIRCHER.
MAX SIENZ.